US011397129B2

(12) United States Patent
Matsui

(10) Patent No.: US 11,397,129 B2
(45) Date of Patent: Jul. 26, 2022

(54) DEVICE FOR DETERMINING NORMALITY OF ELECTROMAGNETIC CONTROL VALVE

(71) Applicants: JATCO Ltd, Fuji (JP); NISSAN MOTOR CO., LTD., Yokohama (JP)

(72) Inventor: Junki Matsui, Isehara (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 338 days.

(21) Appl. No.: 16/487,298

(22) PCT Filed: Jan. 26, 2018

(86) PCT No.: PCT/JP2018/002376
§ 371 (c)(1),
(2) Date: Aug. 20, 2019

(87) PCT Pub. No.: WO2018/155068
PCT Pub. Date: Aug. 30, 2018

(65) Prior Publication Data
US 2020/0018668 A1    Jan. 16, 2020

(30) Foreign Application Priority Data

Feb. 24, 2017    (JP) .............................. JP2017-032851

(51) Int. Cl.
*F16H 61/12* (2010.01)
*F16H 61/14* (2006.01)
(Continued)

(52) U.S. Cl.
CPC .......... *G01M 13/003* (2019.01); *F16H 61/12* (2013.01); *F16H 61/14* (2013.01); *F16H 61/662* (2013.01);
(Continued)

(58) Field of Classification Search
CPC ...... F16D 25/14; F16D 25/0638; F16D 25/42; F16D 25/123; F16D 2300/26; F16D 2300/18; F16K 31/0613
See application file for complete search history.

(56) References Cited

U.S. PATENT DOCUMENTS 8,321,063 B2 * 11/2012 Iwagami ................... G06F 1/28
700/293
9,476,330 B2 * 10/2016 Kojima ..................... F01L 9/20
(Continued)

FOREIGN PATENT DOCUMENTS

JP            2013-87923 A    5/2013

*Primary Examiner* — Tin H Dang
(74) *Attorney, Agent, or Firm* — Foley & Lardner LLP

(57) ABSTRACT

An electromagnetic control valve normality determination system includes: a hydraulic pressure source; an electromagnetic control valve structured to regulate an actual pressure of oil to a pressure command point, wherein the oil is supplied from the hydraulic pressure source; and an actual pressure sensor structured to sense the actual pressure of the oil. For determining normality of pressure regulation of the electromagnetic control valve, a normality determinator is configured to: set pressure command regions for determination about pressure regulation of the electromagnetic control valve, without overlapping among the pressure command regions; determine for each of the pressure command regions whether a difference between the actual pressure and the pressure command point in the each of the pressure command regions is less than a threshold value; and determine that the electromagnetic control valve is normal, in response to affirmation of the determination for all of the pressure command regions.

12 Claims, 5 Drawing Sheets

(51) Int. Cl.
*F16H 61/662* (2006.01)
*G01M 13/003* (2019.01)
*F16K 31/06* (2006.01)
*F01L 1/344* (2006.01)

(52) U.S. Cl.
CPC ....... *F16H 61/66236* (2013.01); *F16K 31/06* (2013.01); *F01L 2001/3443* (2013.01)

(56) References Cited

U.S. PATENT DOCUMENTS

| | | | |
|---|---|---|---|
| 9,487,202 B2* | 11/2016 | Ishida | B60T 13/662 |
| 2014/0174411 A1* | 6/2014 | Matsunaga | F02M 25/0809 |
| | | | 123/520 |
| 2017/0167603 A1* | 6/2017 | Igarashi | F15B 1/04 |
| 2018/0135746 A1* | 5/2018 | Murakami | F16H 61/12 |

* cited by examiner

DEVICE FOR DETERMINING NORMALITY OF ELECTROMAGNETIC CONTROL VALVE

TECHNICAL FIELD

The present invention relates to an electromagnetic control valve normality determination system for an electromagnetic control valve structured to regulate oil to a pressure command point, wherein the oil is supplied from a hydraulic pressure source.

BACKGROUND ART

A patent document 1 discloses a conventional system, which checks a relationship between a pressure command point and an actual pressure value of an electromagnetic control valve, and determines the electromagnetic control valve as normal in response to a condition of a difference between the pressure command point and the actual pressure value≤a threshold value, and determines the electromagnetic control valve as abnormal in response to a condition of the difference between the pressure command point and the actual pressure value>the threshold value.

However, the conventional system is confronted with a problem that when the electromagnetic control valve is failed, the system may determine the electromagnetic control valve incorrectly as normal, because the system employs a single pressure command region for normality determination.

Specifically, when the electromagnetic control valve is failed such that oil is drained (for example, such that an oil passage is opened more widely than intended), a first value of actual pressure obtained by output of the pressure command point is small however the pressure command point is set. With such a failure, if normality/abnormality of the electromagnetic control valve is determined when the pressure command point is close to the first value of actual pressure, the difference between the pressure command point and the first value of actual pressure is smaller than the threshold value, thereby causing the electromagnetic control valve to be determined incorrectly as normal. On the other hand, when the electromagnetic control valve is failed such that oil fails to be drained (for example, such that the oil passage is opened more narrowly than intended), a second value of the actual pressure obtained by output of the pressure command point is high however the pressure command point is set. With such a failure, if normality/abnormality of the electromagnetic control valve is determined when the pressure command point is close to the second value of actual pressure, the electromagnetic control valve is determined incorrectly as normal.

PRIOR ART DOCUMENT(S)

Patent Document(s)

Patent Document 1: JP 2013-87923 A

SUMMARY

In view of the foregoing, it is desirable to accurately determine normality of pressure regulation of the electromagnetic control valve while preventing incorrect determination when the electromagnetic control valve is failed.

According to one or more embodiments, an electromagnetic control valve normality determination system comprises: a hydraulic pressure source; an electromagnetic control valve structured to regulate an actual pressure of oil to a pressure command point, wherein the oil is supplied from the hydraulic pressure source; a normality determinator configured to determine normality of pressure regulation of the electromagnetic control valve; and an actual pressure sensor structured to sense the actual pressure of the oil; wherein the normality determinator is configured to: set pressure command regions for determination about pressure regulation of the electromagnetic control valve, without overlapping among the pressure command regions; determine for each of the pressure command regions whether a difference between the actual pressure and the pressure command point in the each of the pressure command regions is less than a threshold value; and determine that the electromagnetic control valve is normal, in response to affirmation of the determination for all of the pressure command regions.

The feature of setting the pressure command regions for determination about pressure regulation of the electromagnetic control valve without overlapping between the pressure command regions, serves to accurately determine normality of pressure regulation of the electromagnetic control valve while preventing incorrect determination when the electromagnetic control valve is failed.

DETAILED DESCRIPTION

Figure 1:
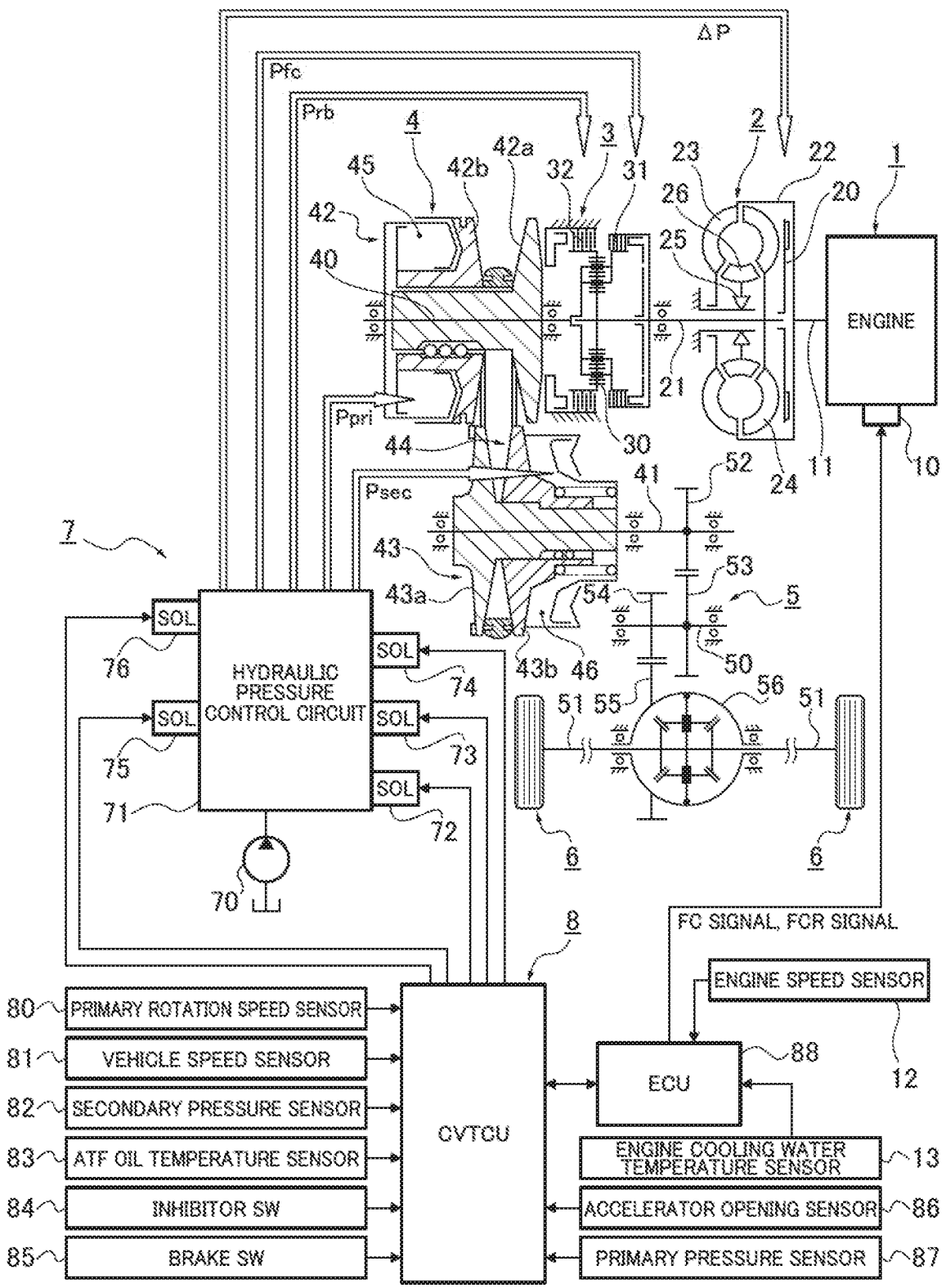
FIG. 1 is an entire system diagram showing a drive system and a control system of an engine vehicle provided with a belt-type continuously variable transmission to which an electromagnetic control valve normality determination system according to a first embodiment is applied.

The following describes an electromagnetic control valve normality determination system according to a first embodiment shown in the drawings.

The electromagnetic control valve normality determination system according to the first embodiment is applied to an engine vehicle in which an engine and a belt-type continuously variable transmission are mounted in a drive system. The following describes configuration of the first embodiment in separate sections, i.e., [Entire System Configuration], [Normal Transmission Shift Control Configuration and Lockup Control Configuration], and [Configuration of Normality Determination Process for Electromagnetic Control Valve].

[Entire System Configuration] FIG. 1 shows the drive system and a control system of the engine vehicle to which a transmission shift control system according to the first embodiment is applied. As shown in FIG. 1, the drive system of the engine vehicle includes an engine 1, a torque converter 2, a forward-rearward drive switching mechanism 3, a variator 4, a final reduction mechanism 5, and driving wheels 6, 6. Torque converter 2, forward-rearward drive switching mechanism 3, variator 4, and final reduction mechanism 5 are housed in a transmission case, to form a transmission shift unit in a belt-type continuously variable transmission (automatic transmission).

Engine 1 is a drive source for driving the vehicle, wherein an idle control and an engine output control are performed based on a quantity of operation of an accelerator by a driver. In addition to the engine output control, a fuel cut control is performed to stop fuel supply to engine 1, in response to input of a fuel cut signal when the accelerator is released. Accordingly, engine 1 includes a fuel injection actuator 10 that is configured to stop fuel injection in response to input of the fuel cut signal (FC signal), and restart fuel injection in response to input of a fuel cut recovery signal (FCR signal).

Torque converter 2 is a vehicle-starting element having a torque-boosting function, and contains a lockup clutch 20 structured to be engaged when the torque-boosting function is not required. Torque converter 2 is composed of a pump impeller 23, a turbine runner 24, and a stator 26, wherein pump impeller 23 is connected to an engine output shaft 11 via a converter housing 22, and turbine runner 24 is connected to a torque converter output shaft 21, and stator 26 is provided to the case via a one-way clutch 25.

When lockup clutch 20 is disengaged, torque transfer between engine output shaft 11 and torque converter output shaft 21 is performed via torque converter 2. When lockup clutch 20 is completely engaged, lockup clutch 20 establishes direct drive connection between engine output shaft 11 and torque converter output shaft 21. Accordingly, when lockup clutch 20 is completely engaged, the engine speed is equal to the turbine speed.

Forward-rearward drive switching mechanism 3 is a mechanism to switch the direction of input rotation to variator 4, i.e. to a normal rotational direction for forward drive and to a reverse rotational direction for rearward drive. Forward-rearward drive switching mechanism 3 includes a double pinion planetary gear mechanism 30, a forward-drive clutch 31, and a rearward-drive brake 32, wherein forward-drive clutch 31 is a wet-type multiplate clutch, and rearward-drive brake 32 is a wet-type multiplate brake.

When a forward drive range such as a D range is selected, forward-drive clutch 31 is engaged hydraulically by receipt of a forward-drive clutch pressure Pfc. When a rearward drive range such as an R range is selected, rearward-drive brake 32 is engaged hydraulically by receipt of a rearward-drive brake pressure Prb. When an N range is selected, both of forward-drive clutch 31 and rearward-drive brake 32 are disengaged.

Variator 4 is a continuously variable transmission mechanism structured to vary continuously a transmission ratio (i.e. a ratio between the input rotational speed and output rotational speed of the variator) by varying belt contact diameters. Variator 4 includes a primary pulley 42, a secondary pulley 43, and a pulley belt 44.

Primary pulley 42 includes a stationary pulley 42a and a slide pulley 42b which are coaxially arranged on a variator input shaft 40 connected to a carrier of double pinion planetary gear mechanism 30. Slide pulley 42b is structured to slide and move by receipt of a primary pressure Ppri introduced into a primary pressure chamber 45.

Secondary pulley 43 includes a stationary pulley 43a and a slide pulley 43b which are coaxially arranged on a variator output shaft 41 connected to final reduction mechanism 5. Slide pulley 43b is structured to slide and move by receipt of a secondary pressure Psec introduced into a secondary pressure chamber 46.

Pulley belt 44 is wound around V-shaped sheave surfaces of primary pulley 42 and V-shaped sheave surfaces of secondary pulley 43. Pulley belt 44 is composed of: two sets of multiple annular rings, wherein the annular rings of each set are layered from inside to outside; and multiple elements layered annularly and sandwiched by the two sets of annular rings. Pulley belt 44 may be implemented by a chain type belt composed of multiple chain elements that are arranged in a pulley movement direction, and coupled together by a pin passing through in a pulley axial direction.

Final reduction mechanism 5 has a speed reduction function to reduce the rotational speed from variator output shaft 41 of variator 4, and a differential function, and transmits a torque from variator 4 to left and right driving wheels 6, 6. Final reduction mechanism 5 includes a speed reduction gear mechanism composed of a first gear 52, a second gear 53, a third gear 54, and a fourth gear 55, wherein first gear 52 is provided at variator output shaft 41, and second gear 53 and third gear 54 are provided at an idler shaft 50, and fourth gear 55 is provided at an outer periphery of a differential case. Final reduction mechanism 5 further includes a differential gear mechanism composed of a differential gear 56 disposed between left and right drive shafts 51, 51.

As shown in FIG. 1, the control system of the engine vehicle includes a hydraulic pressure control unit 7 as a hydraulic control system and a CVT control unit 8 as an electronic control system.

Hydraulic pressure control unit 7 is structured to generate and regulate control pressures required for torque converter 2, forward-rearward drive switching mechanism 3, and variator 4. Hydraulic pressure control unit 7 includes an oil pump 70 and a hydraulic pressure control circuit 71, wherein oil pump 70 is structured to be rotationally driven by engine 1 as a drive source for driving the vehicle, and wherein hydraulic pressure control circuit 71 is structured to regulate the various control pressures based on a discharge pressure from oil pump 70.

Hydraulic pressure control circuit 71 includes a line pressure solenoid valve 72, a primary pressure solenoid valve 73, a secondary pressure solenoid valve 74, a selection pressure solenoid valve 75, and a lockup solenoid valve 76. Solenoid valves 72, 73, 74, 75, 76 are electromagnetic control valves, each of which may be a target of determination about normality of pressure regulation of oil to a pressure command point sent from CVT control unit 8, wherein the oil is supplied from oil pump 70 (hydraulic pressure source). Each electromagnetic control valve is a valve whose spool position is adjusted in accordance with a command current to a solenoid.

Line pressure solenoid valve 72 is structured to regulate the discharge pressure of oil pump 70 to a line pressure PL as commanded, in response to a line pressure command point outputted from CVT control unit 8. Line pressure PL is an original hydraulic pressure for generating and regulating the various control pressures, and serves to suppress belt slipping and clutch slipping against a torque transferred in the drive system.

Primary pressure solenoid valve 73 is structured to regulate primary pressure Ppri by pressure reduction from line pressure PL, in response to a primary pressure command point outputted from CVT control unit 8, wherein primary pressure Ppri is introduced into primary pressure chamber 45. Secondary pressure solenoid valve 74 is structured to regulate secondary pressure Psec by pressure reduction from line pressure PL, in response to a secondary pressure command point outputted from CVT control unit 8, wherein secondary pressure Psec is introduced into secondary pressure chamber 46.

Selection pressure solenoid valve 75 is structured to regulate forward-drive clutch pressure Pfc by pressure reduction from line pressure PL, in response to a forward-drive clutch pressure command point outputted from CVT control unit 8 when a forward drive range is selected, wherein forward-drive clutch pressure Pfc is supplied to forward-drive clutch 31. Lockup solenoid valve 76 is structured to regulate rearward-drive brake pressure Prb by pressure reduction from line pressure PL, in response to a rearward-drive brake pressure command point outputted from CVT control unit 8 when a rearward drive range is selected, wherein rearward-drive brake pressure Prb is supplied to rearward-drive brake 32.

Lockup solenoid valve 76 is structured to regulate a lockup differential pressure ΔP in accordance with a lockup pressure command point outputted from CVT control unit 8, wherein lockup differential pressure ΔP is a difference between a hydraulic pressure applied to an engaging hydraulic chamber of lockup clutch 20 and a hydraulic pressure applied to a disengaging hydraulic chamber of lockup clutch 20.

CVT control unit 8 is configured to perform a line pressure control, a transmission shift control, a forward-rearward drive switching control, a lockup control, etc. During the line pressure control, CVT control unit 8 outputs to line pressure solenoid valve 72 a lockup pressure command point for controlling the line pressure to a line pressure target point depending on accelerator opening, etc. During the transmission shift control, CVT control unit 8 calculates a target transmission ratio and a target primary rotation speed Npri* of variator 4, and outputs to primary pressure solenoid valve 73 and secondary pressure solenoid valve 74 pressure command points for controlling the transmission ratio and primary rotation speed to the calculated target values. During the forward-rearward drive switching control, CVT control unit 8 outputs to selection pressure solenoid valve 75 a pressure command point for controlling engagement and disengagement of forward-drive clutch 31 and rearward-drive brake 32 in accordance with a selected range position. During the lockup control, CVT control unit 8 determines whether to bring the lockup state of lockup clutch 20 into a completely engaged state, a slip-engaged state, or a disengaged state, and outputs to lockup solenoid valve 76 a pressure command point for controlling the lockup state of lockup clutch 20 as selected.

CVT control unit 8 is configured to receive input of sensor information and switch information from a primary rotation speed sensor 80, a vehicle speed sensor 81, a secondary pressure sensor 82, an ATF oil temperature sensor 83, an inhibitor switch 84, a brake switch 85, an accelerator opening sensor 86, a primary pressure sensor 87, etc. Furthermore, CVT control unit 8 is connected to an engine control unit 88 via a CAN communication line for bidirectional communication, wherein engine control unit 88 is configured to receive input of sensor information from an engine speed sensor 12, an engine cooling water temperature sensor 13, etc.

Secondary pressure sensor 82 is an actual pressure sensor for sensing an actual secondary pressure as a secondary pressure sensor value, wherein the actual secondary pressure is regulated by secondary pressure solenoid valve 74. Primary pressure sensor 87 is an actual pressure sensor for sensing an actual primary pressure as a primary pressure sensor value, wherein the actual primary pressure is regulated by primary pressure solenoid valve 73. Inhibitor switch 84 is structured to sense the selected range position (D range, N range, R range, P range, etc.), and output a range position signal in accordance with the selected range position.

Figure 2:
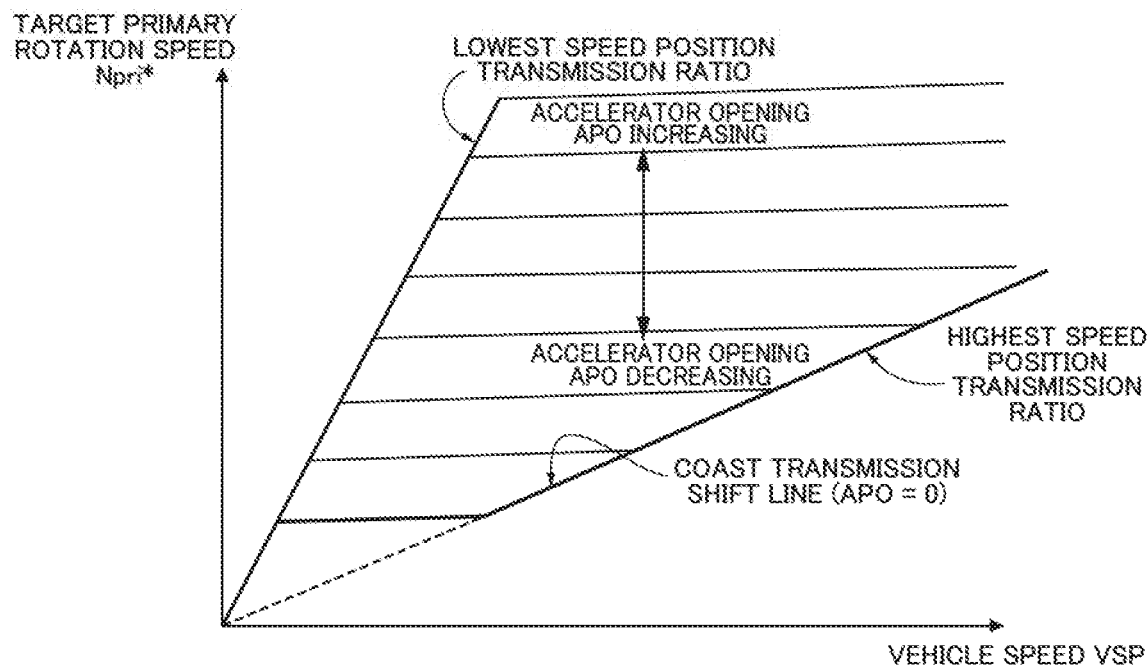
FIG. 2 is a transmission shift schedule diagram showing an example of transmission shift schedule employed for performing a normal transmission shift control by a variator according to the first embodiment.

[Normal Transmission Shift Control Configuration and Lockup Control Configuration] FIG. 2 shows an example of transmission shift schedule employed for performing a normal transmission shift control by variator 4 according to the first embodiment. The following describes configuration of the normal transmission shift control with reference to FIG. 2.

The normal transmission shift control is performed by CVT control unit 8. CVT control unit 8 identifies an operating point (VSP, APO) in a transmission shift schedule shown in FIG. 2 based on vehicle speed VSP sensed by vehicle speed sensor 81 and accelerator opening APO sensed by accelerator opening sensor 86, and calculates target primary rotation speed Npri* depending on the operating point (VSP, APO). After calculating the target primary rotation speed Npri*, CVT control unit 8 performs a hydraulic pressure feedback control to conform the actual primary rotation speed, which is sensed by primary rotation speed sensor 80, to the calculated target primary rotation speed Npri*.

As shown in FIG. 2, the transmission shift schedule is set such that the transmission ratio varies continuously within a range of transmission ratio between a lowest speed position transmission ratio and a highest speed position transmission ratio in accordance with the operating point (VSP, APO). For example, when the accelerator is further depressed while vehicle speed VSP is constant, target primary rotation speed Npri* increases to cause a transmission shift in a downshifting direction. On the other hand, when depression of the accelerator is reduced while vehicle speed VSP is constant, target primary rotation speed Npri* decreases to cause a transmission shift in an upshifting direction. While accelerator opening APO is constant, an increase in vehicle speed VSP causes a transmission shift in the upshifting direction, and a decrease in vehicle speed VSP causes a transmission shift in the downshifting direction. In FIG. 2, a coast transmission shift line is defined to determine target primary rotation speed Npri* when the accelerator is released during the normal transmission shift control.

Figure 3:
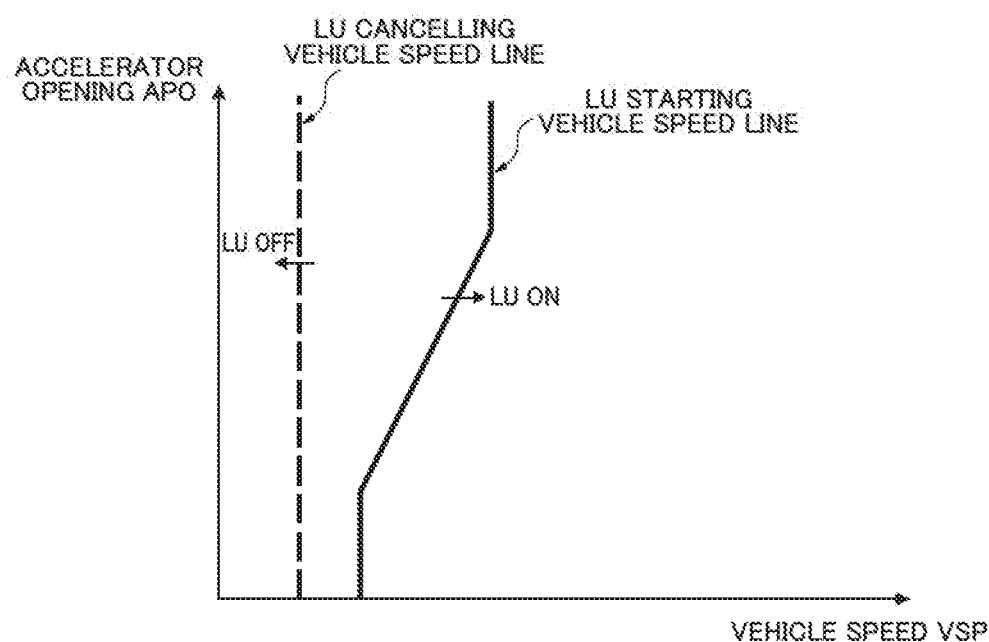
FIG. 3 is a lockup schedule diagram showing an example of lockup schedule employed for performing a lockup control by a lockup clutch mounted in a torque converter according to the first embodiment.

FIG. 3 shows an example of lockup schedule employed for performing the lockup control by lockup clutch 2 mounted in torque converter 2 according to the first embodiment. The following describes configuration of the lockup control with reference to FIG. 3. In the following, "LU" is an abbreviation of "lockup".

The lockup control is performed by CVT control unit 8, similar to the normal transmission shift control. CVT control unit 8 identifies the operating point (VSP, APO) in a lockup schedule shown in FIG. 3 based on vehicle speed VSP sensed by vehicle speed sensor 81 and accelerator opening APO sensed by accelerator opening sensor 86, and selects lockup engagement (LU ON) or lockup disengagement (LU OFF) in accordance with the operating point (VSP, APO). With lockup engagement (LU ON) or lockup disengagement (LU OFF) selected, CVT control unit 8 performs a lockup differential pressure control for transition to the selected lockup engagement (LU ON) or lockup disengagement (LU OFF).

As shown in FIG. 3, the lockup schedule defines an LU starting vehicle speed line (OFF→ON) in a low vehicle speed region (about 10 km/h to 20 km/h, for example) and a LU cancelling vehicle speed line (ON→OFF) in a vehicle speed region lower in vehicle speed than the LU starting vehicle speed line, wherein engagement/disengagement is controlled based on the LU starting vehicle speed line and the LU cancelling vehicle speed line. For example, as the operating point (VSP, APO) moves from a region of "LU OFF" across the LU starting vehicle speed line in accordance with an increase in vehicle speed VSP, a command of clutch engagement is outputted to start engagement control of lockup clutch 20 for entry into a region of "LU ON". On the other hand, as the operating point (VSP, APO) moves from the region of "LU ON" across the LU cancelling vehicle speed line in accordance with a decrease in vehicle speed VSP, a command of clutch disengagement is outputted to start disengagement control of lockup clutch 20 for entry into the region of "LU OFF".

The normal transmission shift control and lockup control are performed based on the assumption that pressure regulation of each of line pressure solenoid valve 72, primary pressure solenoid valve 73, secondary pressure solenoid valve 74, and lockup solenoid valve 76 is normal.

Figure 4:
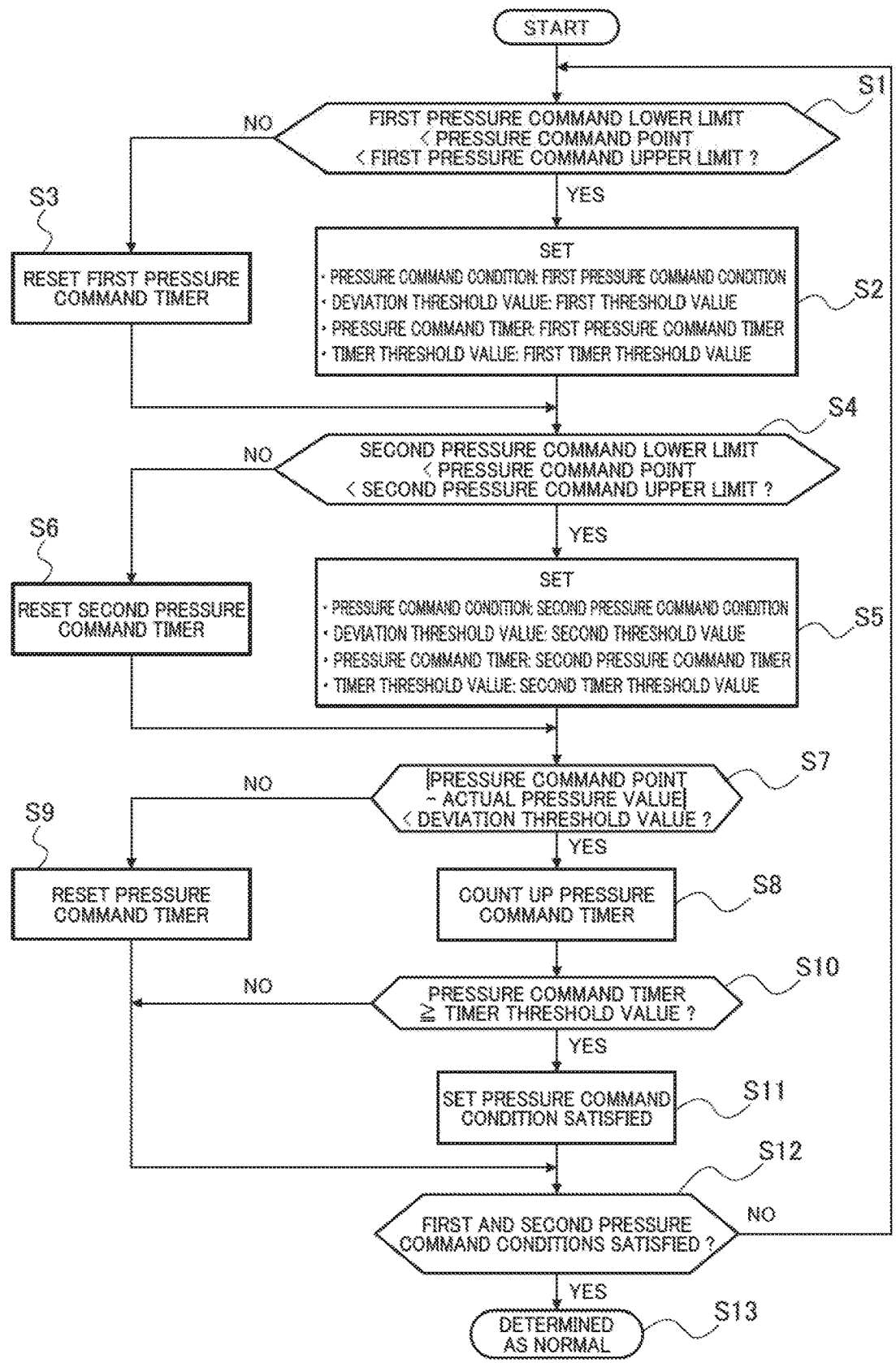
FIG. 4 is a flow chart showing a process of normality determination for an electromagnetic control valve, which is performed by a CVT control unit according to the first embodiment.

[Configuration of Normality Determination Process for Electromagnetic Control Valve] FIG. 4 shows a process of normality determination for an electromagnetic control valve, which is performed by CVT control unit 8 (normality determinator) according to the first embodiment. The following describes steps in FIG. 4 constituting the process of normality determination for the electromagnetic control valve.

At Step S1, following a start, or following a determination at Step S12 that at least one of a first pressure command condition and a second pressure command condition is unsatisfied, CVT control unit 8 determines whether or not the pressure command point is in a first pressure command region in which the pressure command point is greater than a first pressure command lower limit and less than a first pressure command upper limit. In case of YES ([first pressure command lower limit]<[pressure command point]<[first pressure command upper limit]), CVT control unit 8 then proceeds to Step S2. In case of NO ([first pressure command lower limit]≥[pressure command point], or [pressure command point]≥[first pressure command upper limit]), CVT control unit 8 then proceeds to Step S3.

Figure 5:
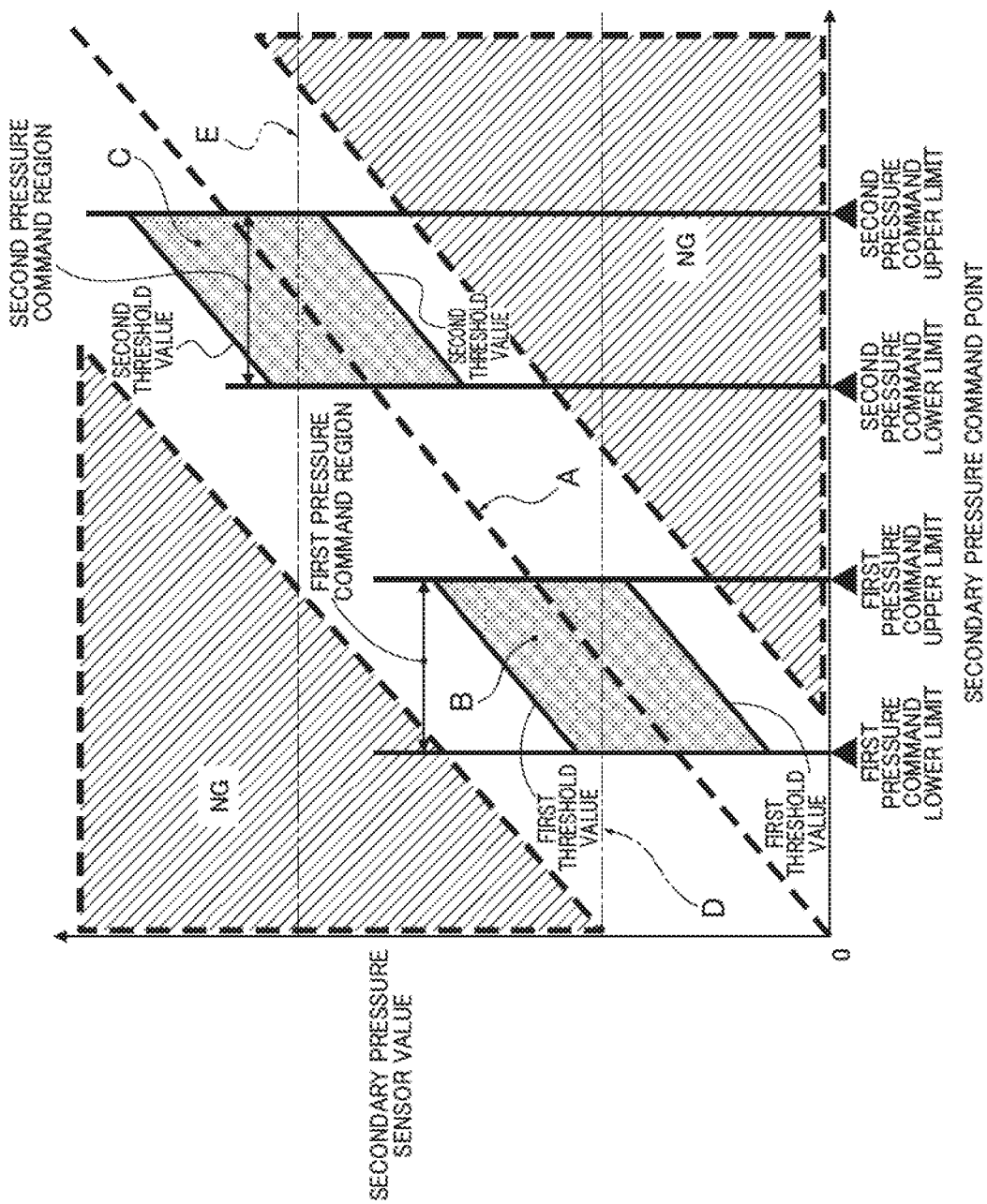
FIG. 5 is a characteristic diagram showing a relationship between a secondary pulley pressure command point (as an example of pressure command point) and a secondary pressure sensor value (as an example of actual pressure value) for illustrating determination about pressure regulation of a secondary pressure solenoid valve.

As shown in FIG. 5, the first pressure command lower limit is set to a level that is prevented from being below a minimum value of pressure required for power transfer in variator 4 (about 0.2 MPa, for example). As shown in FIG. 5, the first pressure command upper limit is set to a sum of the first pressure command lower limit and a first pressure command region width. For example, in case where the target of determination is secondary pressure solenoid valve 74, the first pressure command region width is set to a sum of a dispersion of accuracy of secondary pressure sensor 82 and a dispersion of the secondary sensor value with respect to the secondary pressure command point.

At Step S2, following a determination at Step S1 ([first pressure command lower limit]<[pressure command point]<[first pressure command upper limit]), CVT control unit 8 sets a pressure command condition (first pressure command condition), a deviation threshold value (first threshold value), a pressure command timer (first pressure command timer), and a timer threshold value (first timer threshold value), and then proceeds to Step S4.

For example, in case of secondary pressure solenoid valve 74, the first threshold value is set to a specific width to define a positive side level and a negative side level such that the positive side level is deviated in a positive direction of the secondary pressure sensor value by the specific width from a normal condition linear characteristic line A of the secondary sensor value with respect to the secondary pressure command point, and the negative side level is deviated in a negative direction of the secondary pressure sensor value by the specific width from the normal condition linear characteristic line A.

At Step S3, following a determination at Step S2 ([first pressure command lower limit]≥[pressure command point], or [pressure command point]≥[first pressure command upper limit]), CVT control unit 8 resets the first pressure command timer, and then proceeds to Step S4.

At Step S4, following the setting of the first pressure command condition at Step S2, or following the resetting of the first pressure command timer at Step S3, CVT control unit 8 determines whether or not the pressure command point is in a second pressure command region in which the pressure command point is greater than a second pressure command lower limit and less than a second pressure command upper limit. In case of YES ([second pressure command lower limit]<[pressure command point]<[second pressure command upper limit]), CVT control unit 8 then proceeds to Step S5. In case of NO ([second pressure command lower limit]≥[pressure command point], or [pressure command point]≥[second pressure command upper limit]), CVT control unit 8 then proceeds to Step S6.

The second pressure command lower limit is set to a level that is apart from the first pressure command upper limit at least by a dispersion of the actual pressure value with respect to the pressure command point (about 0.5 MPa, for example). As shown in FIG. 5, the second pressure command upper limit is set to a sum of the second pressure command lower limit and a second pressure command region width, which is a level that is prevented from being above a maximum value of hydraulic pressure produced by oil pump 70 (about 0.6 MPa, for example). For example, in case where the target of determination is secondary pressure solenoid valve 74, the second pressure command region width is set to a sum of a dispersion of accuracy of secondary pressure sensor 82 and a dispersion of the secondary sensor value with respect to the secondary pressure command point. The second pressure command region width may be set equal to the first pressure command region width.

At Step S5, following a determination at Step S4 ([second pressure command lower limit]<[pressure command point]<[second pressure command upper limit]), CVT control unit 8 sets a pressure command condition (second pressure command condition), a deviation threshold value (second threshold value), a pressure command timer (second pressure command timer), and a timer threshold value (second timer threshold value), and then proceeds to Step S7.

For example, in case of secondary pressure solenoid valve 74, the second threshold value is set to a specific width to define a positive side level and a negative side level such that the positive side level is deviated in the positive direction of the secondary pressure sensor value by the specific width from the normal condition linear characteristic line A of the secondary sensor value with respect to the secondary pressure command point, and the negative side level is deviated in the negative direction of the secondary pressure sensor value by the specific width from the normal condition linear characteristic line A. The second threshold value may be set equal to the first threshold value, or different from the first threshold value.

At Step S6, following a determination at Step S4 ([second pressure command lower limit]≥[pressure command point], or [pressure command point]≥[second pressure command upper limit]), CVT control unit 8 resets the second pressure command timer, and then proceeds to Step S7.

At Step S7, following the setting of the second pressure command condition at Step S5, or following the resetting of the second pressure command timer at Step S6, CVT control unit 8 determines whether or not |[pressure command point]−[actual pressure value]| is smaller than the deviation threshold value. In case of YES |[pressure command point]−[actual pressure value]|<[deviation threshold value]), CVT control unit 8 then proceeds to Step S8. In case of NO (|[pressure command point]−[actual pressure value]|≥[deviation threshold value]), CVT control unit 8 then proceeds to Step S9.

For example, in case that the target of determination is secondary pressure solenoid valve 74, when the secondary pressure command point is in the first pressure command region shown in FIG. 5, CVT control unit 8 determines whether or not |[secondary pressure command point]−[secondary pressure sensor value]| is in a dotted region B in which |[secondary pressure command point]−[secondary pressure sensor value]| is smaller than the first threshold value. Furthermore, when the secondary pressure command point is in the second pressure command region shown in FIG. 5, CVT control unit 8 determines whether or not |[secondary pressure command point]−[secondary pressure sensor value]| is in a dotted region C in which |[secondary pressure command point]−[secondary pressure sensor value]| is smaller than the second threshold value.

At Step S8, following a determination at Step S7 (|[pressure command point]−[actual pressure value]|<[deviation threshold value]), CVT control unit 8 counts up the pressure command timer, and then proceeds to Step S10.

In case that the target of determination is secondary pressure solenoid valve 74, CVT control unit 8 counts up the first pressure command timer, when a point of determination, which is defined by the secondary pressure command point and the secondary pressure sensor value, is in the dotted region B shown in FIG. 5. Furthermore, CVT control unit 8 counts up the second pressure command timer, when the point of determination, which is defined by the secondary pressure command point and the secondary pressure sensor value, is in the dotted region C shown in FIG. 5.

At Step S9, following a determination at Step S7 that (|[pressure command point]−[actual pressure value]|≥[deviation threshold value]), CVT control unit 8 resets the pressure command timer, and then proceeds to Step S12.

In case that the target of determination is secondary pressure solenoid valve 74, CVT control unit 8 resets the first pressure command timer, which has been counted up, when the point of determination gets out of the dotted region B shown in FIG. 5. CVT control unit 8 resets the second pressure command timer, which has been counted up, when the point of determination gets out of the dotted region C shown in FIG. 5.

At Step S10, following the count-up of the pressure command timer at Step S8, CVT control unit 8 determines whether or not the pressure command timer is greater than or equal to the timer threshold value. In case of YES ([pressure command timer]≥[timer threshold value]), CVT control unit 8 then proceeds to Step S11. In case of NO ([pressure command timer]<[timer threshold value]), CVT control unit 8 then proceeds to Step S12.

In case that the target of determination is secondary pressure solenoid valve 74, CVT control unit 8 determines whether or not the first pressure command timer, which indicates a duration in which the point of determination remains in the dotted region B shown in FIG. 5, is greater than or equal to the first threshold value. Furthermore, CVT control unit 8 determines whether or not the second pressure command timer, which indicates a duration in which the point of determination remains in the dotted region C shown in FIG. 5, is greater than or equal to the second threshold value.

At Step S11, following a determination at Step S10 ([pressure command timer]≥[timer threshold value]), CVT control unit 8 sets the pressure command condition satisfied, and then proceeds to Step S12.

In case that the target of determination is secondary pressure solenoid valve 74, CVT control unit 8 sets the first pressure command condition satisfied, when the first pressure command timer, which indicates the duration in which the point of determination remains in the dotted region B shown in FIG. 5, is greater than or equal to the first threshold value. Furthermore, CVT control unit 8 sets the second pressure command condition satisfied, when the second pressure command timer, which indicates the duration in which the point of determination remains in the dotted region C shown in FIG. 5, is greater than or equal to the second threshold value.

At Step S12, following the resetting of the pressure command timer at Step S9, or following a determination at Step S10 ([pressure command timer]<[timer threshold value]), or following the satisfaction of the pressure command condition at Step S11, CVT control unit 8 determines whether or not both of the first pressure command condition and the second pressure command condition are satisfied. In case of YES (both of the first pressure command condition and the second pressure command condition are satisfied), CVT control unit 8 then proceeds to Step S13. In case of NO (at least one of the first pressure command condition and the second pressure command condition is unsatisfied), CVT control unit 8 then returns to Step S1.

At Step S13, following a determination at Step S12 that both of the first pressure command condition and the second pressure command condition are satisfied, CVT control unit 8 assumes that normality determination is completed, and then terminates the process of normality determination.

The following describes behavior of the first embodiment with secondary pressure solenoid valve 74 as a target of determination, in separate sections, namely, [Behavior of Normality Determination for Secondary Pressure Solenoid Valve When Secondary Pressure Solenoid Valve is Normal], [Behavior of Normality Determination for Secondary Pressure Solenoid Valve When Secondary Pressure Solenoid Valve is Failed], and [Characteristic Behavior of Normality Determination for Secondary Pressure Solenoid Valve].

[Behavior of Normality Determination for Secondary Pressure Solenoid Valve When Secondary Pressure Solenoid Valve is Normal] The following describes behavior of the process of normality determination for secondary pressure solenoid valve 74, when secondary pressure solenoid valve 74 is normal, with reference to the flow chart shown in FIG. 4.

While the pressure command point outputted to secondary pressure solenoid valve 74 is out of the first pressure command region and out of the second pressure command region, the flow of Step S1→Step S3→Step S4→Step S6→Step S7→Step S9→Step S12 is repeated. Namely, under this condition, it is in a standby state where the first pressure command timer and the second pressure command timer are maintained reset.

Thereafter, when the pressure command point outputted to secondary pressure solenoid valve 74 enters the first pressure command region to set the deviation threshold value condition satisfied, the flow of Step S1→Step S2→Step S4→Step S6→Step S7→Step S8→Step S10→Step S12 is repeated. Namely, a process is repeated in which the first pressure command timer is counted up at Step S8, and the first pressure command timer is thereafter determined as less than the first timer threshold value at Step S10.

As the first pressure command timer is counted up at Step S8 on multiple occasions, it determines at Step S10 that the first pressure command timer≥the first timer threshold value, and then proceeds to Step S11 where the first pressure command condition is set satisfied. Then, the answer to Step S12 becomes NO, because the first pressure command condition is satisfied and the second pressure command condition is unsatisfied, and it then returns to Step S1. When the first pressure command condition is satisfied, a first pressure command condition satisfaction flag is set to indicate that the first pressure command condition is satisfied.

Thereafter, when the pressure command point gets out of the first pressure command region so that the pressure command point is out of both of the first pressure command region and the second pressure command region, the flow of Step S1→Step S3→Step S4→Step S6→Step S7→Step S9→Step S12 is repeated. Again, it is in a standby state where the first pressure command timer and the second pressure command timer are maintained reset.

Thereafter, when the pressure command point outputted to secondary pressure solenoid valve 74 enters the second pressure command region to set the deviation threshold value condition satisfied, the flow of Step S1→Step S3→Step S4→Step S5→Step S7→Step S8→Step S10→Step S12 is repeated. Namely, a process is repeated in which the second pressure command timer is counted up at Step S8, and the second pressure command timer is thereafter determined as less than the second timer threshold value at Step S10.

As the second pressure command timer is counted up at Step S8 on multiple occasions, it determines at Step S10 that the second pressure command timer the second timer threshold value, and then proceeds to Step S11 where the second pressure command condition is set satisfied. Then, the answer to Step S12 becomes YES, because the first pressure command condition is first satisfied and the second pressure command condition is now satisfied, and it then proceeds to Step S13 where secondary pressure solenoid valve 74 is determined as normal.

Figure 6:
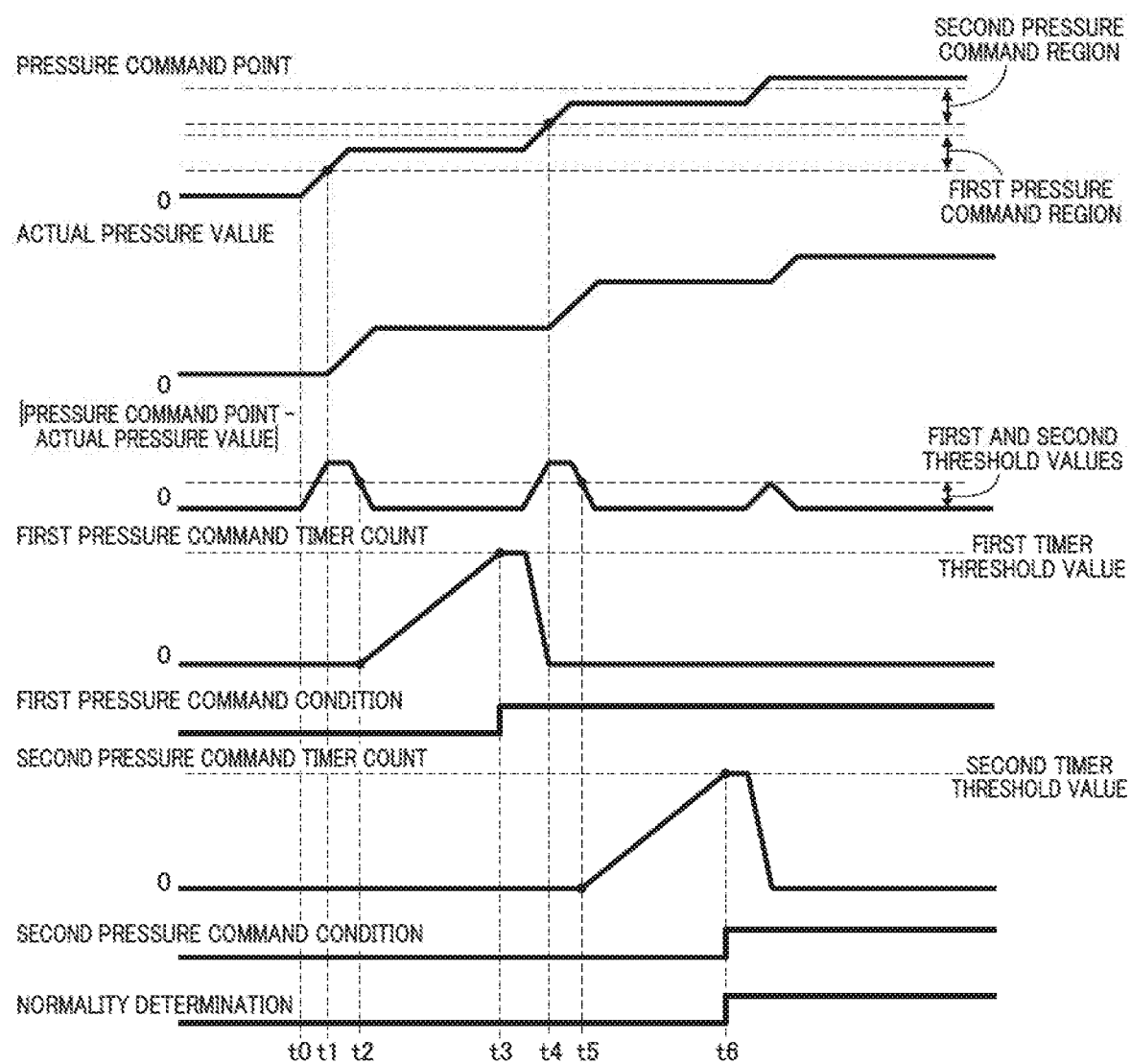
FIG. 6 is a time chart showing characteristics of pressure command point, actual pressure value, |[pressure command point]-[actual pressure value]|, first pressure command timer count, first pressure command condition, second pressure command timer count, second pressure command condition, and normality determination, when the secondary pressure solenoid valve is determined as normal during normality determination for the secondary pressure solenoid valve.

The following describes behavior of the normality determination for secondary pressure solenoid valve 74 when secondary pressure solenoid valve 74 is normal, with reference to a time chart shown in FIG. 6.

At a time instant t0, the pressure command point starts to increase, and enters the first pressure command region at a time instant t1. At a time instant t2, the deviation threshold value condition (|[pressure command point]−[actual pressure value]|<[first threshold value]) is satisfied, and the first pressure command timer starts to be counted up. After time instant t2, the pressure command point is maintained substantially constant in the first pressure command region, and the deviation threshold value condition is maintained satisfied, and accordingly, the first pressure command timer continues to be counted up toward a time instant t3. At time instant t3, the first pressure command timer reaches the first timer threshold value, and the first pressure command condition is set satisfied.

Thereafter, at a time instant t4, the pressure command point enters the second pressure command region, and at a time instant t5, the deviation threshold value condition (|[pressure command point]−[actual pressure value]|<[second threshold value]) is satisfied, and the second pressure command timer starts to be counted up. After time instant t5, the pressure command point is maintained substantially constant in the second pressure command region, and the deviation threshold value condition is maintained satisfied, and accordingly, the second pressure command timer continues to be counted up toward a time instant t6. At time instant t6, the second pressure command timer reaches the second timer threshold value, and the second pressure command condition is set satisfied. At time instant t6, since both of the first pressure command condition and the second pressure command condition are satisfied, secondary pressure solenoid valve 74 is determined as normal.

In this way, when secondary pressure solenoid valve 74 is normal, secondary pressure solenoid valve 74 is not determined as normal at a timing when only one of the first pressure command condition and the second pressure command condition is satisfied. Namely, secondary pressure solenoid valve 74 is determined as normal, after awaiting a timing when both of the first pressure command condition and the second pressure command condition are satisfied. Although the first pressure command condition is first satisfied and the second pressure command condition is thereafter satisfied in the foregoing example, the same holds true in situations where the second pressure command condition is first satisfied and the first pressure command condition is thereafter satisfied.

[Behavior of Normality Determination for Secondary Pressure Solenoid Valve When Secondary Pressure Solenoid Valve is Failed] The following describes behavior of the process of normality determination for secondary pressure solenoid valve 74, when secondary pressure solenoid valve 74 is failed such that the actual pressure value of secondary pressure solenoid valve 74 is beyond the range defined by the first threshold value and the range defined by the second threshold value with respect to variation of the pressure command point for secondary pressure solenoid valve 74, with reference to the flow chart shown in FIG. 4.

When the actual pressure value is maintained beyond the range defined by the first threshold value and the range defined by the second threshold value with respect to variation of the pressure command point for secondary pressure solenoid valve 74, the deviation threshold value condition at Step S7 maintained unsatisfied irrespective of the magnitude of the pressure command point. Accordingly, the flow of Step S1→Step S2 (or Step S3)→Step S4→Step S5 (or Step S6)→Step S7→Step S9→Step S12 is repeated.

Namely, the answer to Step S12 is NO where both of the first pressure command condition and the second pressure command condition are unsatisfied, and it returns to Step S1, and secondary pressure solenoid valve 74 is not determined as normal.

The following addresses a failure of secondary pressure solenoid valve 74 that a hydraulic passage is opened more widely than intended, and the actual pressure value of secondary pressure solenoid valve 74 is maintained constant at a low level within the range defined by the first threshold value (see line D in FIG. 5) with respect to variation of the pressure command point for secondary pressure solenoid valve 74. The following describes behavior of the process of normality determination for secondary pressure solenoid valve 74 under this condition, with reference to the flow chart shown in FIG. 4.

Under this low pressure failure, when the pressure command point outputted to secondary pressure solenoid valve 74 enters the first pressure command region, the deviation threshold value condition is satisfied, and the first pressure command condition is thereby satisfied. However, when the pressure command point outputted to secondary pressure solenoid valve 74 enters the second pressure command region, the deviation threshold value condition is set unsatisfied. Accordingly, the flow of Step S1→Step S3→Step S4→Step S5→Step S7→Step S9→Step S12 is repeated. Namely, the answer to Step S12 is NO where the first pressure command condition is satisfied but the second pressure command condition is unsatisfied, and it returns to Step S1, and secondary pressure solenoid valve 74 is not determined as normal.

The following addresses a failure of secondary pressure solenoid valve 74 that the hydraulic passage is opened more narrowly than intended, and the actual pressure value of secondary pressure solenoid valve 74 is maintained constant at a high level within the range defined by the second threshold value (see line E in FIG. 5) with respect to variation of the pressure command point for secondary pressure solenoid valve 74. The following describes behavior of the process of normality determination for secondary pressure solenoid valve 74 under this condition, with reference to the flow chart shown in FIG. 4.

Under the high pressure failure that the actual pressure value of secondary pressure solenoid valve 74 is maintained constant within the range defined by the second threshold value with respect to variation of the pressure command point for secondary pressure solenoid valve 74, when the pressure command point outputted to secondary pressure solenoid valve 74 enters the second pressure command region, the deviation threshold value condition is satisfied, and the second pressure command condition is thereby satisfied. However, when the pressure command point outputted to secondary pressure solenoid valve 74 enters the first pressure command region, the deviation threshold value condition is set unsatisfied. Accordingly, the flow of Step S1→Step S2→Step S4→Step S6→Step S7→Step S9→Step S12 is repeated. Namely, the answer to Step S12 is NO where the second pressure command condition is satisfied but the first pressure command condition is unsatisfied, and it returns to Step S1, and secondary pressure solenoid valve 74 is not determined as normal.

In this way, when secondary pressure solenoid valve 74 is failed, secondary pressure solenoid valve 74 is prevented from being determined as normal, because both of the first pressure command condition and the second pressure command condition are unsatisfied also under the low pressure failure and under the high pressure failure in which one of the first pressure command condition and the second pressure command condition is satisfied.

[Characteristic Behavior of Normality Determination for Secondary Pressure Solenoid Valve] According to the first embodiment, a normality determination system for secondary pressure solenoid valve 74 is configured to: set pressure command regions for determination about pressure regulation of secondary pressure solenoid valve 74, without overlapping among the pressure command regions; determine for each of the pressure command regions whether a difference between the actual pressure and the pressure command point in the each of the pressure command regions is less than a threshold value; and determine that secondary pressure solenoid valve 74 is normal, in response to affirmation of the determination for all of the pressure command regions.

The feature of setting pressure command regions for determination about pressure regulation of electromagnetic control valve 74, without overlapping among the pressure command regions, allows to identify characteristics of relationship between the pressure command point and actual pressure value by connection of all of points of determination at which the difference is smaller than the threshold value, when secondary pressure solenoid valve 74 is normal. When the characteristics identified by connection of all of the points of determination coincide with the normal condition characteristics of relationship, secondary pressure solenoid valve 74 can be determined as normal. In other words, if the difference fails to be determined as smaller than the threshold value in at least one of the pressure command regions, the characteristics of relationship between the pressure command point and the actual pressure value is not identified, and secondary pressure solenoid valve 74 is not determined as normal. Therefore, during determination about pressure regulation of secondary pressure solenoid valve 74, it is possible to accurately perform determination about normality of pressure regulation of secondary pressure solenoid valve 74, while preventing incorrect determination when secondary pressure solenoid valve 74 is failed.

According to the first embodiment, the normality determination system for secondary pressure solenoid valve 74 is configured to: set first and second pressure command regions for determination about pressure regulation of secondary pressure solenoid valve 74, without overlapping between the first and second pressure command regions; determine for the first pressure command region whether a difference between a first value of the actual pressure and a first value of the pressure command point in the first pressure command region is less than a first threshold value; determine for the second pressure command region whether a difference between a second value of the actual pressure and a second value of the pressure command point in the second pressure command region is less than a second threshold value; and determine that secondary pressure solenoid valve 74 is normal, in response to affirmation of the determination for both of the first and second pressure command regions.

In case that the target of determination is secondary pressure solenoid valve 74, the relationship between the pressure command point and the actual pressure value has a linear characteristic, and it is possible to identify the linear characteristic based on two determination regions. If a solenoid failure occurs to drain oil, and the actual pressure value is maintained low even by output of any pressure command point, the difference between the first pressure command point and the actual pressure value is smaller than the first threshold value when the pressure command point is in the first pressure command region. However, the difference between the second pressure command point and the actual pressure value fails to be smaller than the second threshold value, so that secondary pressure solenoid valve 74 is not determined as normal. Similarly, if a solenoid failure occurs to prevent oil from being drained, and the actual pressure value is maintained high even by output of any pressure command point, the difference between the second pressure command point and the actual pressure value is smaller than the second threshold value when the pressure command point is in the second pressure command region. However, the difference between the first pressure command point and the actual pressure value fails to be smaller than the first threshold value, so that secondary pressure solenoid valve 74 is not determined as normal.

In this way, the first and second pressure command regions are set for determination about pressure regulation of secondary pressure solenoid valve 74, without overlapping between the first and second pressure command regions. This serves to accurately perform determination about normality of pressure regulation of secondary pressure solenoid valve 74, while minimizing the number of determination regions for determination about pressure regulation of secondary pressure solenoid valve 74, and thereby simplifying the process.

According to the first embodiment, secondary pressure solenoid valve 74 is a hydraulic pressure control valve structured to regulate secondary pressure Psec supplied to secondary pulley 43 of a belt-type continuously variable transmission mounted in a vehicle driveline; and the normality determination system for secondary pressure solenoid valve 74 is configured to prevent a lower limit of the first value of the pressure command point from being lower than a minimum value of pressure required for power transfer in the belt-type continuously variable transmission.

In the belt-type continuously variable transmission, the minimum pressure is supplied to prevent belt slipping, irrespective of whether secondary pressure solenoid valve 74 is normal or failed. Namely, irrespective of whether secondary pressure solenoid valve 74 is normal or failed, the actual secondary pressure is constantly prevented from being below the minimum pressure value. Accordingly, if the first pressure command point is provided with no lower limit, and is set below the minimum pressure value, no difference occurs between the first pressure command point and the actual pressure value even when secondary pressure solenoid valve 74 is failed. This causes an incorrect determination that secondary pressure solenoid valve 74 is not failed. In contrast, the feature of preventing the lower limit of the first value of the pressure command point from being lower than the minimum value of pressure required for power transfer in the belt-type continuously variable transmission, serves to prevent incorrect determination that would occur if no lower limit is provided for the first pressure command point.

According to the first embodiment, the normality determination system for secondary pressure solenoid valve 74 is configured to prevent an upper limit of the second value of the pressure command point from being higher than a maximum value of hydraulic pressure generated by oil pump 70.

In the belt-type continuously variable transmission, the actual pressure value is limited by and does not exceed the maximum value of hydraulic pressure generated by oil pump 70. Accordingly, if the second pressure command point is provided with no lower limit, and is set above the maximum pressure value, no difference occurs between the second pressure command point and the actual pressure value even when secondary pressure solenoid valve 74 is failed. This causes an incorrect determination that secondary pressure solenoid valve 74 is not failed. In contrast, the feature of preventing the upper limit of the second value of the pressure command point from being higher than the maximum value of hydraulic pressure generated by oil pump 70, serves to prevent incorrect determination that would occur if no lower limit is provided for the second pressure command point.

According to the first embodiment, the normality determination system for secondary pressure solenoid valve 74 is configured to set a width of each of the first and second pressure command regions by summation of first and second dispersions, wherein the first dispersion is a dispersion of accuracy of secondary pressure sensor 82, and the second dispersion is a dispersion of the actual pressure with respect to the pressure command point.

If each pressure command region between the lower limit of the pressure command point and the upper limit of the pressure command point is set narrow, the pressure command point enters the pressure command region, and immediately exits the pressure command region, so that the timer condition is maintained unsatisfied, and the first pressure command condition and the second pressure command condition are maintained unsatisfied. On the other hand, if each pressure command region is set wide, the first pressure command region and the second pressure command region are close to each other, so that it may be impossible to ensure a suitable interval between the first pressure command region and the second pressure command region. In contrast, the feature of setting the width of each pressure command region by summation of the first and second dispersions, wherein the first dispersion is a dispersion of accuracy of secondary pressure sensor 82, and the second dispersion is a dispersion of the actual pressure with respect to the pressure command point, allows the pressure command region to absorb the first and second dispersions. This serves to set the suitable pressure command region width with which normality determination is prevented from failing to be achieved and the first pressure command region and the second pressure command region are prevented from being close to each other.

According to the first embodiment, the normality determination system for secondary pressure solenoid valve 74 is configured to set an upper limit of the pressure command point in the first pressure command region and a lower limit of the pressure command point in the second pressure command region to be apart from each other by at least a dispersion of the actual pressure with respect to the pressure command point.

If the interval between the first pressure command region and the second pressure command region is small, when the determination is based on the actual pressure value with respect to the first pressure command point in the first pressure command region lower in hydraulic pressure, the actual pressure value in the second pressure command region higher in hydraulic pressure may be sensed due to dispersion. Conversely, when the determination is based on the actual pressure value with respect to the second pressure command point in the second pressure command region higher in hydraulic pressure, the actual pressure value in the first pressure command region lower in hydraulic pressure may be sensed due to dispersion. In this situation, it is impossible to determine the first pressure command condition and the second pressure command condition separately, and identify normality based on satisfaction of both of the conditions. This adversely affects the accuracy of determination. In contrast, the feature that the interval between the first pressure command region and the second pressure command region is set greater than equal to the dispersion of the actual pressure value with respect to the pressure command point, serves to determine the first pressure command condition and the second pressure command condition separately, even with the dispersion of the actual pressure value with respect to the pressure command point, and thereby identify normality based on satisfaction of both of the first pressure command condition and the second pressure command condition.

The following describes effects. The electromagnetic control valve normality determination system according to the first embodiment produces effects as follows.

<1> According to the first embodiment, an electromagnetic control valve normality determination system includes: a hydraulic pressure source (oil pump 70); an electromagnetic control valve (secondary pressure solenoid valve 74) structured to regulate an actual pressure of oil to a pressure command point, wherein the oil is supplied from the hydraulic pressure source (oil pump 70); a normality determinator (CVT control unit 8) configured to determine normality of pressure regulation of the electromagnetic control valve (secondary pressure solenoid valve 74); and an actual pressure sensor (secondary pressure sensor 82) structured to sense the actual pressure of the oil; wherein the normality determinator (CVT control unit 8, FIG. 4) is configured to: set pressure command regions for determination about pressure regulation of the electromagnetic control valve (secondary pressure solenoid valve 74), without overlapping among the pressure command regions; determine for each of the pressure command regions whether a difference between the actual pressure and the pressure command point in the each of the pressure command regions is less than a threshold value; and determine that the electromagnetic control valve (secondary pressure solenoid valve 74) is normal, in response to affirmation of the determination for all of the pressure command regions. This serves to accurately perform determination about normality of pressure regulation of the electromagnetic control valve (secondary pressure solenoid valve 74), while preventing incorrect determination when the electromagnetic control valve (secondary pressure solenoid valve 74) is failed.

<2> The normality determinator (CVT control unit 8, FIG. 4) is configured to: set first and second pressure command regions for determination about pressure regulation of the electromagnetic control valve (secondary pressure solenoid valve 74), without overlapping between the first and second pressure command regions; determine for the first pressure command region whether a difference between a first value of the actual pressure and a first value of the pressure command point in the first pressure command region is less than a first threshold value; determine for the second pressure command region whether a difference between a second value of the actual pressure and a second value of the pressure command point in the second pressure command region is less than a second threshold value; and determine that the electromagnetic control valve (secondary pressure solenoid valve 74) is normal, in response to affirmation of the determination for both of the first and second pressure command regions. This serves to accurately perform determination about normality of pressure regulation of the electromagnetic control valve (secondary pressure solenoid valve 74), while minimizing the number of determination regions for determination about pressure regulation of the electromagnetic control valve (secondary pressure solenoid valve 74), and thereby simplifying the process, in addition to the effect of <1>.

<3> The electromagnetic control valve (secondary pressure solenoid valve 74) is one of hydraulic pressure control valves structured to regulate hydraulic pressures supplied to parts of an automatic transmission (belt-type continuously variable transmission) mounted in a vehicle driveline; and the normality determinator (CVT control unit 8, FIG. 4) is configured to prevent a lower limit of the first value of the pressure command point from being lower than a minimum value of pressure required for power transfer in the automatic transmission (belt-type continuously variable transmission). This serves to prevent incorrect determination that would occur if no lower limit is provided for the first pressure command point, in addition to the effect of <2>.

<4> The normality determinator (CVT control unit 8, FIG. 4) is configured to prevent an upper limit of the second value of the pressure command point from being higher than a maximum value of hydraulic pressure generated by the hydraulic pressure source (oil pump 70). This serves to prevent incorrect determination that would occur if no lower limit is provided for the second pressure command point, in addition to the effect of <2> or <3>.

<5> The normality determinator (CVT control unit 8, FIG. 4) is configured to set a width of each of the first and second pressure command regions by summation of first and second dispersions, wherein the first dispersion is a dispersion of accuracy of the actual pressure sensor (secondary pressure sensor 82), and the second dispersion is a dispersion of the actual pressure with respect to the pressure command point. This serves to set the suitable pressure command region width with which normality determination is prevented from failing to be achieved and the first pressure command region and the second pressure command region are prevented from being close to each other, in addition to the effects of <1>~<4>.

<6> The normality determinator (CVT control unit 8, FIG. 4) is configured to set an upper limit of the pressure command point in the first pressure command region and a lower limit of the pressure command point in the second pressure command region to be apart from each other by at least a dispersion of the actual pressure with respect to the pressure command point. This serves to determine the first pressure command condition and the second pressure command condition separately, even with the dispersion of the actual pressure value with respect to the pressure command point, and thereby identify normality of the electromagnetic control valve (secondary pressure solenoid valve 74) based on satisfaction of both of the first pressure command condition and the second pressure command condition.

Although the electromagnetic control valve normality determination system has been described above with reference to the first embodiment, specific configurations are not limited to the first embodiment, but may be modified by design modifications and additions without going out of the substance of the invention defined by the accompanying claims.

In the first embodiment, the hydraulic pressure source is implemented by oil pump 70 driven by engine 1. However, the hydraulic pressure source is not so limited, but may be implemented by an electric oil pump driven by an electric motor other than a drive source such as an engine for driving the vehicle, or may be implemented by a combination of a mechanical oil pump driven by an engine and an electric oil pump.

In the first embodiment, the electromagnetic control valve to be determined about normality is secondary pressure solenoid valve 74 that controls secondary pressure Psec. However, the electromagnetic control valve is not so limited, but in case of belt-type continuously variable transmissions, may be a line pressure solenoid valve, a primary pressure solenoid valve, a selection pressure solenoid valve, or a lockup solenoid valve. For normality determination for the line pressure solenoid valve, the actual pressure sensor is implemented by a line pressure sensor. For normality determination for the primary pressure solenoid valve, the actual pressure sensor is implemented by a primary pressure sensor. For normality determination for the selection pressure solenoid valve, the actual pressure sensor is implemented by a forward-drive clutch pressure sensor and a rearward-drive brake pressure sensor. For normality determination for the lockup solenoid valve, the actual pressure sensor is implemented by a lockup differential pressure sensor. For automatic transmissions other than belt-type continuously variable transmissions, the electromagnetic control valve may be a transmission shift clutch pressure solenoid valve or a transmission shift brake pressure solenoid valve for controlling a hydraulic pressure supplied to a friction engagement element during transmission shifting, instead of the primary pressure solenoid valve, secondary pressure solenoid valve, and selection pressure solenoid valve.

In the first embodiment, the automatic transmission is implemented by the belt-type continuously variable transmission. However, the automatic transmission may be an automatic transmission that is a so-called step AT that varies the transmission ratio stepwise, or a belt-type continuously variable transmission provided with an auxiliary transmission, which is a combination of a continuously variable transmission and a step-shift automatic transmission.

In the first embodiment, the electromagnetic control valve normality determination system is applied to the engine vehicle provided with the belt-type continuously variable transmission and the engine in the drive system. However, the electromagnetic control valve normality determination system is not limited to engine vehicles, but may be applied to hybrid vehicles provided with an engine and a motor for driving the vehicle, as long as the vehicle is provided with an electromagnetic control valve for regulating oil to a pressure command point, wherein the oil is supplied from a hydraulic pressure source.

In the first embodiment, the relationship between the pressure command point and the actual pressure value of the electromagnetic control valve is confirmed at at least two points. However, the concept that the relationship between the two parameters is confirmed at at least two points may be implemented otherwise. For example, it may compare the primary pressure sensor value with the secondary pressure sensor value, and confirm at at least two points whether or not the pressure sensor values are in suitable balance, thereby performing the normality determination for the primary pressure sensor and the secondary pressure sensor.

The invention claimed is:

1. An electromagnetic control valve normality determination system comprising:
    a hydraulic pressure source;
    an electromagnetic control valve structured to regulate an actual pressure of oil to a pressure command point, wherein the oil is supplied from the hydraulic pressure source;
    a normality determinator configured to determine normality of pressure regulation of the electromagnetic control valve; and
    an actual pressure sensor structured to sense the actual pressure of the oil;
    wherein the normality determinator is configured to:
        set pressure command regions without overlap among the pressure command regions, each of the pressure command regions corresponding to a range of pressures in which the pressure command point is locatable;
        determine for each of the pressure command regions whether a difference between the actual pressure and the pressure command point in the each of the pressure command regions is less than a threshold value; and
        determine that the electromagnetic control valve is in a first state, in response to determining the difference in each of the pressure command regions is less than the threshold value, the first state being a state in which the difference in each of the pressure command regions is less than the threshold value.

2. The electromagnetic control valve normality determination system as claimed in claim 1, wherein the normality determinator is configured to:
    set, among the pressure command regions, a first pressure command region and a second pressure command region without overlap between the first pressure command region and the second pressure command region;
    determine for the first pressure command region whether a difference between a first value of the actual pressure and a first value of the pressure command point in the first pressure command region is less than a first threshold value;
    determine for the second pressure command region whether a difference between a second value of the actual pressure and a second value of the pressure command point in the second pressure command region is less than a second threshold value; and
    determine that the electromagnetic control valve is in the first state, in response to determining the difference in the first pressure command region and the difference in the second pressure command region are less than the first threshold value and the second threshold value, respectively.

3. The electromagnetic control valve normality determination system as claimed in claim 2, wherein:
    the electromagnetic control valve is one of hydraulic pressure control valves structured to regulate hydraulic pressures supplied to parts of an automatic transmission mounted in a vehicle driveline; and
    the normality determinator is configured to prevent a lower limit of the first value of the pressure command point from being lower than a minimum value of pressure required for power transfer in the automatic transmission.

4. The electromagnetic control valve normality determination system as claimed in claim 2, wherein the normality determinator is configured to prevent an upper limit of the second value of the pressure command point from being higher than a maximum value of hydraulic pressure generated by the hydraulic pressure source.

5. The electromagnetic control valve normality determination system as claimed in claim 2, wherein the normality determinator is configured to set a width of each of the first and second pressure command regions by summation of first and second dispersions, wherein the first dispersion is a dispersion of accuracy of the actual pressure sensor, and the second dispersion is a dispersion of the actual pressure with respect to the pressure command point.

6. The electromagnetic control valve normality determination system as claimed in claim 2, wherein the normality determinator is configured to set an upper limit of the pressure command point in the first pressure command region and a lower limit of the pressure command point in the second pressure command region to be apart from each other by at least a dispersion of the actual pressure with respect to the pressure command point.

7. The electromagnetic control valve normality determination system as claimed in claim 3, wherein the normality determinator is configured to prevent an upper limit of the second value of the pressure command point from being higher than a maximum value of hydraulic pressure generated by the hydraulic pressure source.

8. The electromagnetic control valve normality determination system as claimed in claim 3, wherein the normality determinator is configured to set a width of each of the first and second pressure command regions by summation of first and second dispersions, wherein the first dispersion is a dispersion of accuracy of the actual pressure sensor, and the second dispersion is a dispersion of the actual pressure with respect to the pressure command point.

9. The electromagnetic control valve normality determination system as claimed in claim 3, wherein the normality determinator is configured to set an upper limit of the pressure command point in the first pressure command region and a lower limit of the pressure command point in the second pressure command region to be apart from each other by at least a dispersion of the actual pressure with respect to the pressure command point.

10. The electromagnetic control valve normality determination system as claimed in claim 4, wherein the normality determinator is configured to set a width of each of the first and second pressure command regions by summation of first and second dispersions, wherein the first dispersion is a dispersion of accuracy of the actual pressure sensor, and the second dispersion is a dispersion of the actual pressure with respect to the pressure command point.

11. The electromagnetic control valve normality determination system as claimed in claim 4, wherein the normality determinator is configured to set an upper limit of the pressure command point in the first pressure command region and a lower limit of the pressure command point in the second pressure command region to be apart from each other by at least a dispersion of the actual pressure with respect to the pressure command point.

12. The electromagnetic control valve normality determination system as claimed in claim 5, wherein the normality determinator is configured to set an upper limit of the pressure command point in the first pressure command region and a lower limit of the pressure command point in the second pressure command region to be apart from each other by at least a dispersion of the actual pressure with respect to the pressure command point.

* * * * *